(12) United States Patent
Hsieh et al.

(10) Patent No.: US 10,697,880 B1
(45) Date of Patent: Jun. 30, 2020

(54) SMOKE DETECTING DEVICE (71) Applicant: EVERDAY TECHOLOGY CO., LTD., Yilan County (TW)

(72) Inventors: Shih-Hsiung Hsieh, Yilan County (TW); Chi-Yu Lan, Yilan County (TW)

(73) Assignee: EVERDAY TECHNOLOGY CO., LTD., Yilan County (TW)

( * ) Notice: Subject to any disclaimer, the term of this patent is extended or adjusted under 35 U.S.C. 154(b) by 0 days.

(21) Appl. No.: 16/377,243

(22) Filed: Apr. 7, 2019

(51) Int. Cl.
*G01N 15/06* (2006.01)
*G01N 21/53* (2006.01)

(52) U.S. Cl.
CPC ..... *G01N 15/06* (2013.01); *G01N 2015/0693* (2013.01)

(58) Field of Classification Search
CPC .......... G01N 21/53; G01N 2021/4707; G01N 2021/4709; G01N 2201/062; G01N 2015/0693; G08B 17/103; G08B 17/10; G08B 17/107; G08B 17/113; G08B 29/185
See application file for complete search history.

(56) References Cited

U.S. PATENT DOCUMENTS

| | | | | |
|---|---|---|---|---|
| 4,857,895 A * | 8/1989 | Kaprelian | ............ | G08B 17/103 340/630 |
| 5,280,272 A * | 1/1994 | Nagashima | .......... | G08B 17/107 250/574 |
| 5,381,130 A * | 1/1995 | Thuillard | ............. | G08B 17/107 250/575 |
| 5,642,099 A * | 6/1997 | Nagashima | .......... | G08B 17/107 250/574 |
| 6,218,950 B1 * | 4/2001 | Politze | ..................... | G06K 9/00 340/619 |
| 8,638,436 B2 * | 1/2014 | Dohi | ..................... | G01N 21/53 340/628 |
| 2007/0229824 A1 * | 10/2007 | Politze | ................. | G08B 17/107 356/336 |
| 2009/0128821 A1 * | 5/2009 | Sugimoto | ............ | G01N 21/274 356/438 |
| 2011/0068936 A1 * | 3/2011 | Shimada | .............. | G08B 17/113 340/584 |
| 2011/0181870 A1 * | 7/2011 | Penney | ..................... | F21V 9/30 356/72 |

(Continued)

*Primary Examiner* — Sang H Nguyen
(74) *Attorney, Agent, or Firm* — Li & Cai Intellectual Property Office (57) ABSTRACT

A smoke detecting device includes a main body, a light-emitter, a first light-receiver, and a second light-receiver. The main body includes a smoke detecting chamber formed therein. The light-emitter is located within the smoke detecting chamber. The first light-receiver is located within the smoke detecting chamber. An optical axis of the first light-receiver and an optical axis of the light-emitter cooperatively define a first scattering angle there-between. The second light-receiver is located within the smoke detecting chamber. An optical axis of the second light-receiver and an optical axis of the light-emitter corporately define a second scattering angle there-between. The second light-receiver is closer to the light-emitter than to the first light-receiver. The second scattering angle is smaller than the first scattering angle.

4 Claims, 12 Drawing Sheets

(56) References Cited

U.S. PATENT DOCUMENTS

| | | | | |
|---|---|---|---|---|
| 2011/0194111 A1* | 8/2011 | Dohi | ............... | G01N 21/53 |
| | | | | 356/340 |
| 2012/0262714 A1* | 10/2012 | Gonzales | ............... | G01N 21/53 |
| | | | | 356/338 |
| 2013/0135607 A1* | 5/2013 | Wedler | ............... | G01N 21/53 |
| | | | | 356/51 |
| 2014/0168647 A1* | 6/2014 | Ju | ............... | G01N 21/53 |
| | | | | 356/338 |

* cited by examiner

SMOKE DETECTING DEVICE

FIELD OF THE DISCLOSURE

The present disclosure relates to a smoke detecting device, and more particularly to a photoelectric smoke detecting device.

BACKGROUND OF THE DISCLOSURE

Figure 1:
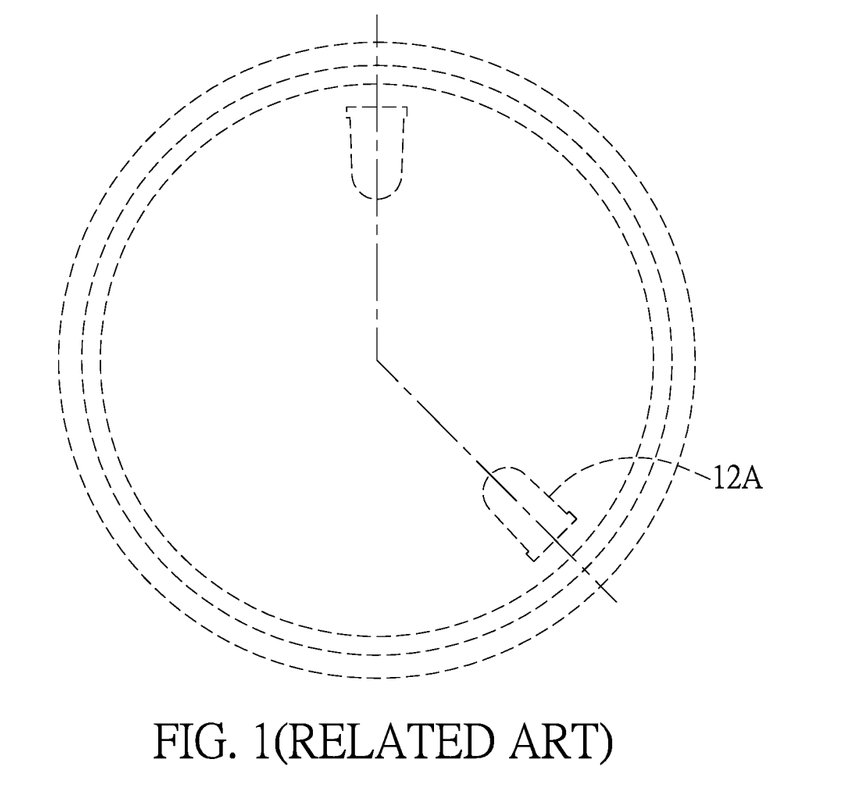
FIG. 1 is a schematic view of a conventional smoke detecting device.
Figure 2:
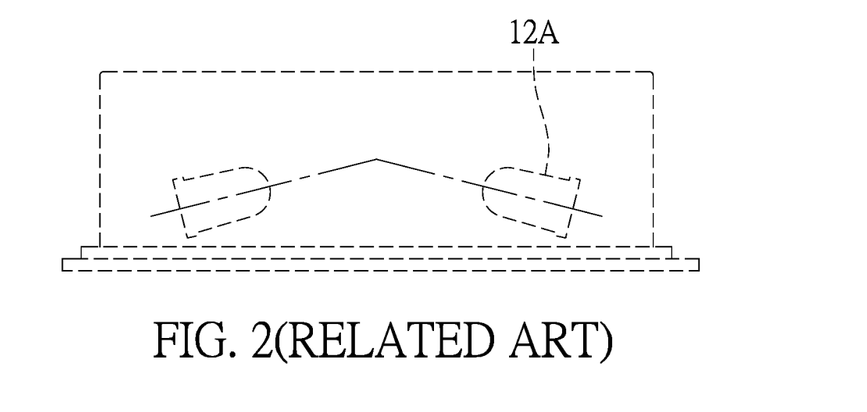
FIG. 2 is a schematic view of another conventional smoke detecting device.

The conventional smoke detecting device, especially the photoelectric detecting device, includes a light-emitter and a light-receiver. The light-emitter emits direct light in a predetermined time period, and when there is no smoke, the signal intensity of light received by the light-receiver is the weakest. However, if smoke particles enter the inside of the photoelectric detecting device, the originally-direct light will become a scattered light due to the collision with the smoke particles. Furthermore, with the increase of smoke density, the signal intensity of light received by the light-receiver will also increase. When the signal intensity of light reaches a certain level, the photoelectric detecting device will issue an alarm signal. FIGS. 1 and 2 are respectively schematic views of conventional smoke detecting devices. However, each conventional photoelectric smoke detecting device uses only one light-receiver 12A for detection, and it is relatively sensitive to smoke particles generated during cooking, thus causing so-called false alarms. On the other hand, if the sensitivity is reduced, the alarm signal for smoke particles generated from the burning of foam materials, e.g., from furniture, will be delayed, which may negatively affect the escape and safety of personnel.

The abovementioned drawbacks of the conventional smoke detecting device seem to suggest that there is still room for improvement in the art.

SUMMARY OF THE DISCLOSURE

One objective of the present disclosure is to provide a smoke detecting device that can overcome the aforementioned drawbacks.

In one aspect, the present disclosure provides a smoke detecting device, including a main body, a light-emitter, a first light-receiver, and a second light-receiver. The main body includes a smoke detecting chamber formed therein. The light-emitter is located within the smoke detecting chamber. The first light-receiver is located within the smoke detecting chamber. An optical axis of the first light-receiver and an optical axis of the light-emitter cooperatively define a first scattering angle there-between. The second light-receiver is located within the smoke detecting chamber. An optical axis of the second light-receiver and an optical axis of the light-emitter cooperatively define a second scattering angle there-between. The second light-receiver is closer to the light-emitter than to the first light-receiver. The second scattering angle is smaller than the first scattering angle.

Preferably, the main body has a main cover and a main base, the main cover covers the main base, and the smoke detecting chamber is formed between the main cover and the main base.

Preferably, the light-emitter, the first light-receiver, and the second light-receiver are disposed on the main base, the optical axis of the light-emitter forms an angle with a surface of the main base, the optical axis of the first light-receiver forms an angle with the surface of the main base, the optical axis of the second light-receiver forms an angle with the surface of the main base, the first light-receiver and the light-emitter are arranged relatively, and the optical axis of the first light-receiver is non-collinear with that of the light-emitter.

Preferably, the main base is provided with a mounting base formed on the surface of the main base, the mounting base has a light-emitter mounting portion, a first light-receiver mounting portion, a second light-receiver mounting portion, and a light-guiding portion, the light-emitter is mounted on the light-emitter mounting portion, the first light-receiver is mounted on the first light-receiver mounting portion, the second light-receiver is mounted on the second light-receiver mounting portion, and the light-guiding portion is located between the light-emitter mounting portion and the first light-receiver mounting portion.

Preferably, the light-guiding portion is closer to the light-emitter than to the first light-receiver mounting portion.

Preferably, the light-guiding portion is V-shaped with two light-guiding surfaces facing toward the first light-receiver, and an angle between the two light-guiding surfaces is an obtuse angle.

Preferably, the light-guiding portion has two refractive surfaces respectively arranged opposite to the two light guiding surfaces, and one of the two refractive surfaces faces toward the second light-receiver.

Preferably, the second scattering angle is about 60 degrees and the first scattering angle is about 130 degrees.

Therefore, the smoke detecting device of the present disclosure can make a more accurate determination through the characteristics that the first light-receiver and second light-receiver located at different angle react differently to smoke particles generated by different types of fire, thereby avoiding false alarms or delays of alarms.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE
EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 3:
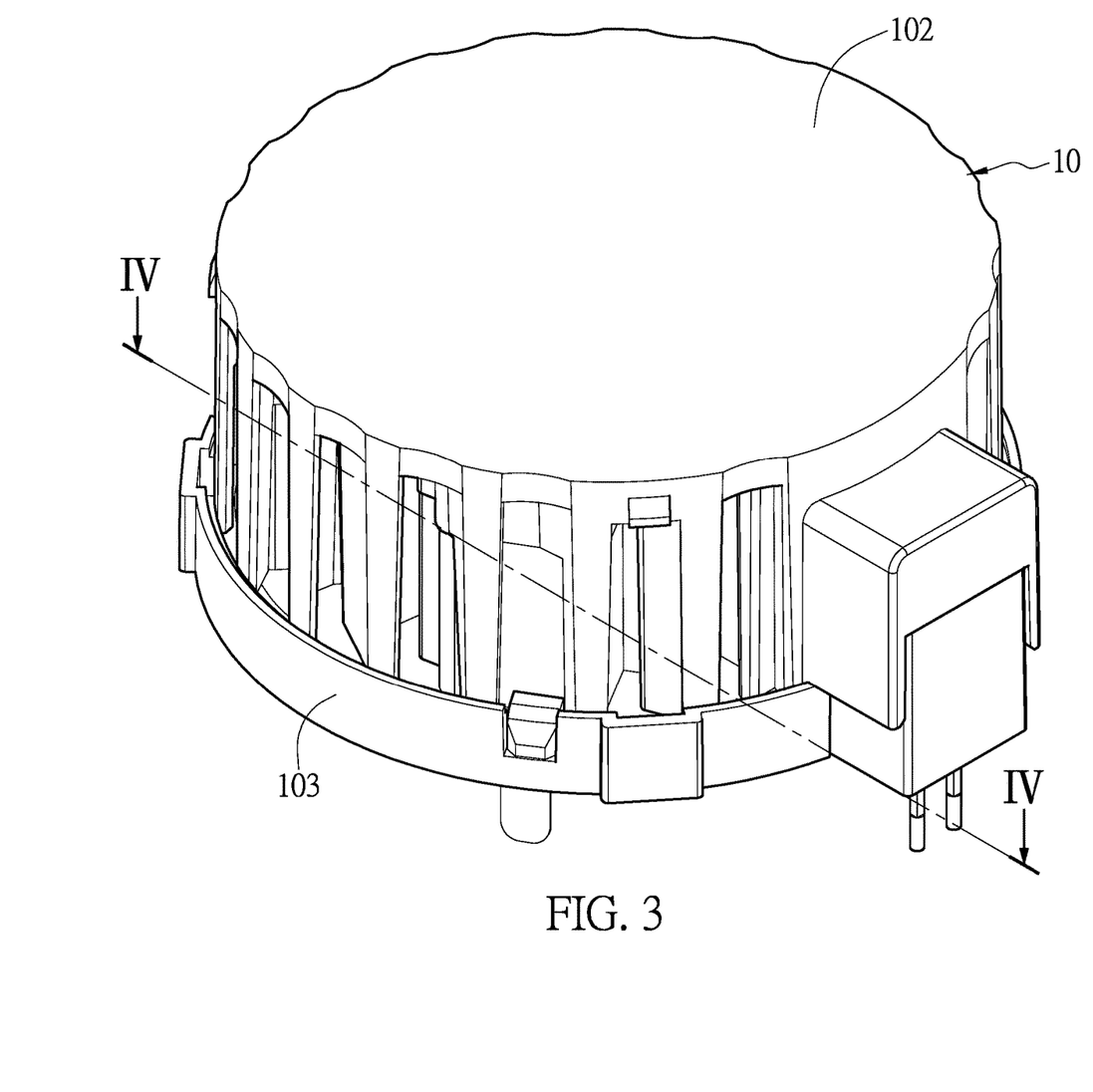
FIG. 3 is a perspective view of a smoke detecting device of the present disclosure.
Figure 4:
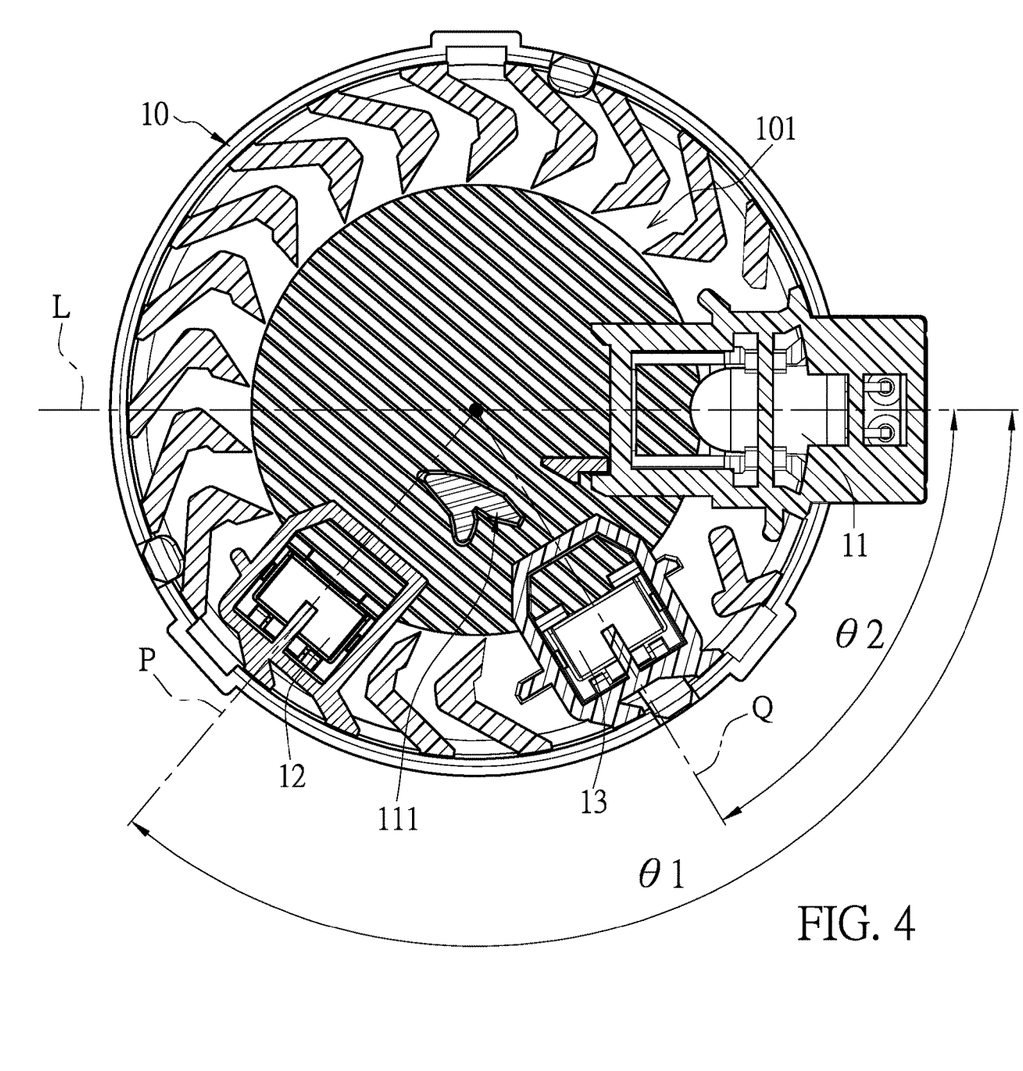
FIG. 4 is a cross-sectional view taken along line IV-IV of FIG. 3.
Figure 5:
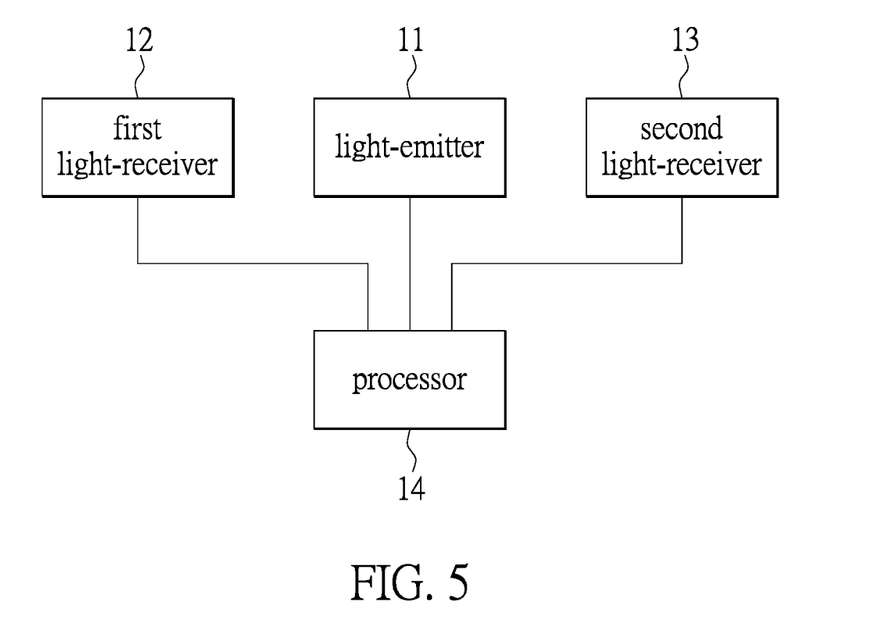
FIG. 5 is a functional block diagram of a smoke detecting device of the present disclosure.
Figure 6:
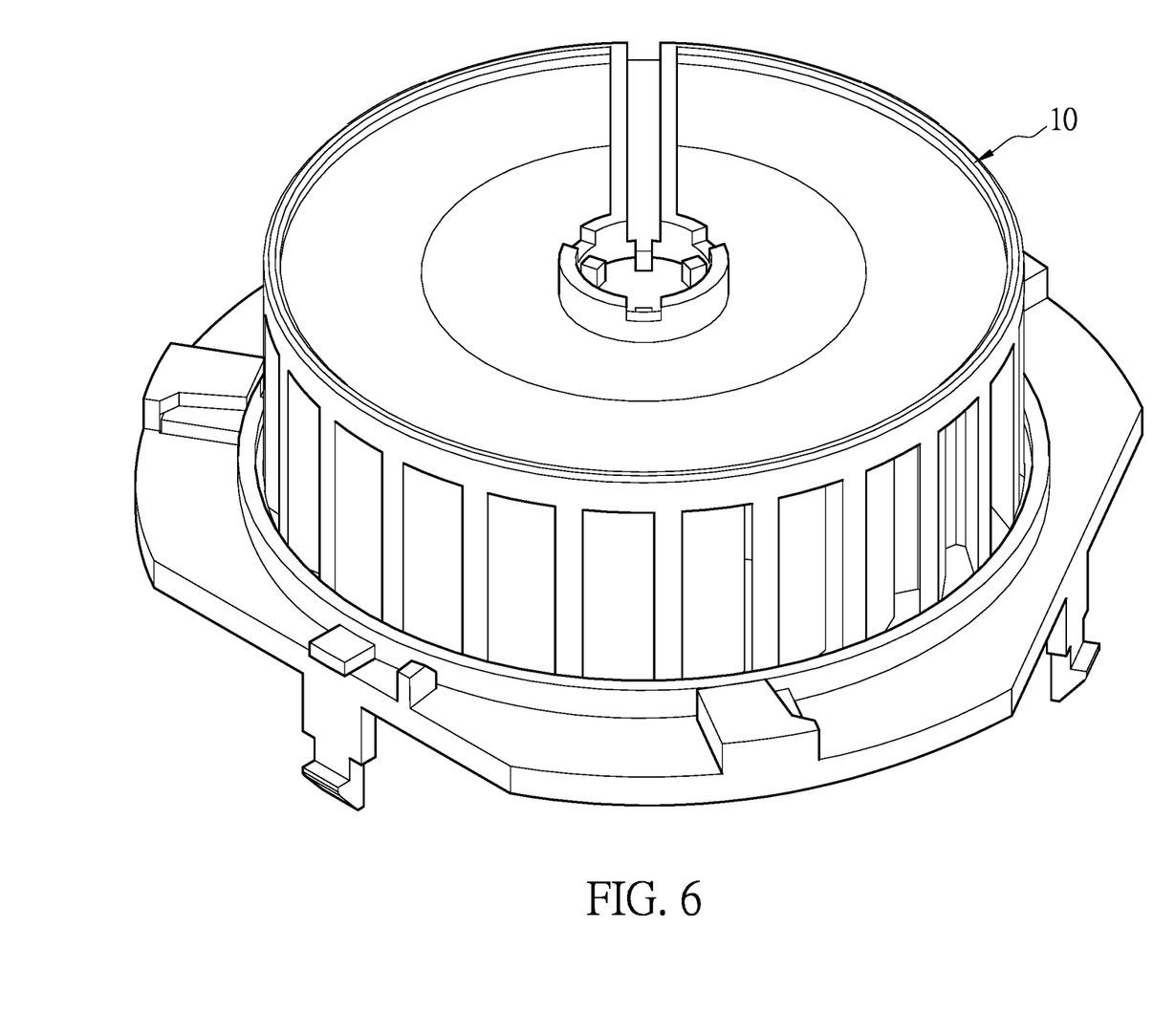
FIG. 6 is a perspective view of another smoke detecting device of the present disclosure.

Referring to FIG. 3 to FIG. 5, the smoke detecting device in accordance with the present disclosure includes a main body 10, which is the basic structure of the smoke detecting device. A smoke detecting chamber 101 is formed in the main body 10, but in this embodiment, there is no limitation on the configurations of the main body 10 and the smoke detecting chamber 101, and they may be adapted according to practical requirements. Furthermore, a light-emitter 11, a first light-receiver 12, and a second light-receiver 13 can be located within the main body 10.

Specifically, the light-emitter 11 is located within the smoke detecting chamber 101 to emit detection light into the smoke detecting chamber 101, so as to allow for scattering through collision with smoke particles. In this embodiment, the light-emitter 11 may be an infrared light emitting diode, and the detection light may be an infrared light.

The first light-receiver 12 is located within the smoke detecting chamber 101, and the optical axis P of the first light-receiver 12 and the optical axis L of the light-emitter 11 cooperatively define a first scattering angle θ1 there-between. In other words, the first scattering angle θ1 is an angle formed by the optical axis P of the first light-receiver 12 and the optical axis L of the light-emitter 11. The first light-receiver 12 can be an infrared light receiving diode, and the first scattering angle θ1 is preferably about 130 degrees.

The second light-receiver 13 is located within the smoke detecting chamber 101, and the optical axis Q of the second light-receiver 13 and the optical axis L of light-emitter 11 define a second scattering angle θ2 there-between. In other words, the second scattering angle θ2 is an angle formed by the optical axis Q of the second light-receiver 13 and the optical axis L of the light-emitter 11. The second light-receiver 13 can be an infrared light receiving diode, and the second scattering angle θ2 is preferably about 60 degrees.

In addition, a shading member 111 may be located within the smoke detecting chamber 101 to block the detection light emitted from the light-emitter 11, so that the first light-receiver 12 and the second light-receiver 13 will not receive the detection light directly. The shading member 111 of the present embodiment is located between the optical axis P of the first light-receiver 12 and the optical axis Q of the second light-receiver 13.

A processor 14 can be disposed in the main body 10, and can be located at an appropriate location inside the main body 10, and is not limited in this embodiment. Furthermore, the processor 14 is electrically coupled to the light-emitter 11, the first light-receiver 12, and the second light-receiver 13, as shown in FIG. 5. The processor 14 can be a single or multiple micro control units (MCUs) that can be operated through a built-in processing program to determine the type of the fire.

It is worth mentioning that in the present embodiment, the second light-receiver 13 is closer to the light-emitter 11 than to the first light-receiver 12, and the second scattering angle θ2 is smaller than the first scattering angle θ1. Furthermore, since the first scattering angle θ1 has a large angle, the first light-receiver 12 has a higher sensitivity to smoke particles generated by cooking. Meanwhile, since the second scattering angle θ2 has a smaller angle, the second light-receiver 13 reacts more smoothly to the accumulation of smoke particles of various fire categories. When determining the category of the fire, the processor 14 can make a relatively accurate determination based on the difference between the intensity of light signal received by the first light-receiver 12 and by the second light-receiver 13, thereby avoiding false alarms or delays of alarms.

Referring to FIG. 6 to FIG. 13, the smoke detecting device in accordance with the present disclosure includes a main body 10, which is the basic structure of the smoke detecting device. A smoke detecting chamber 101 is formed in the main body 10, but in this embodiment, there is no limitation on the configurations of the main body 10 and the smoke detecting chamber 101, and they may be adapted according to practical requirements. That is, the configuration of main body 10 and smoke detecting chamber 101 can also be as shown in FIG. 3 and FIG. 4.

Figure 7:
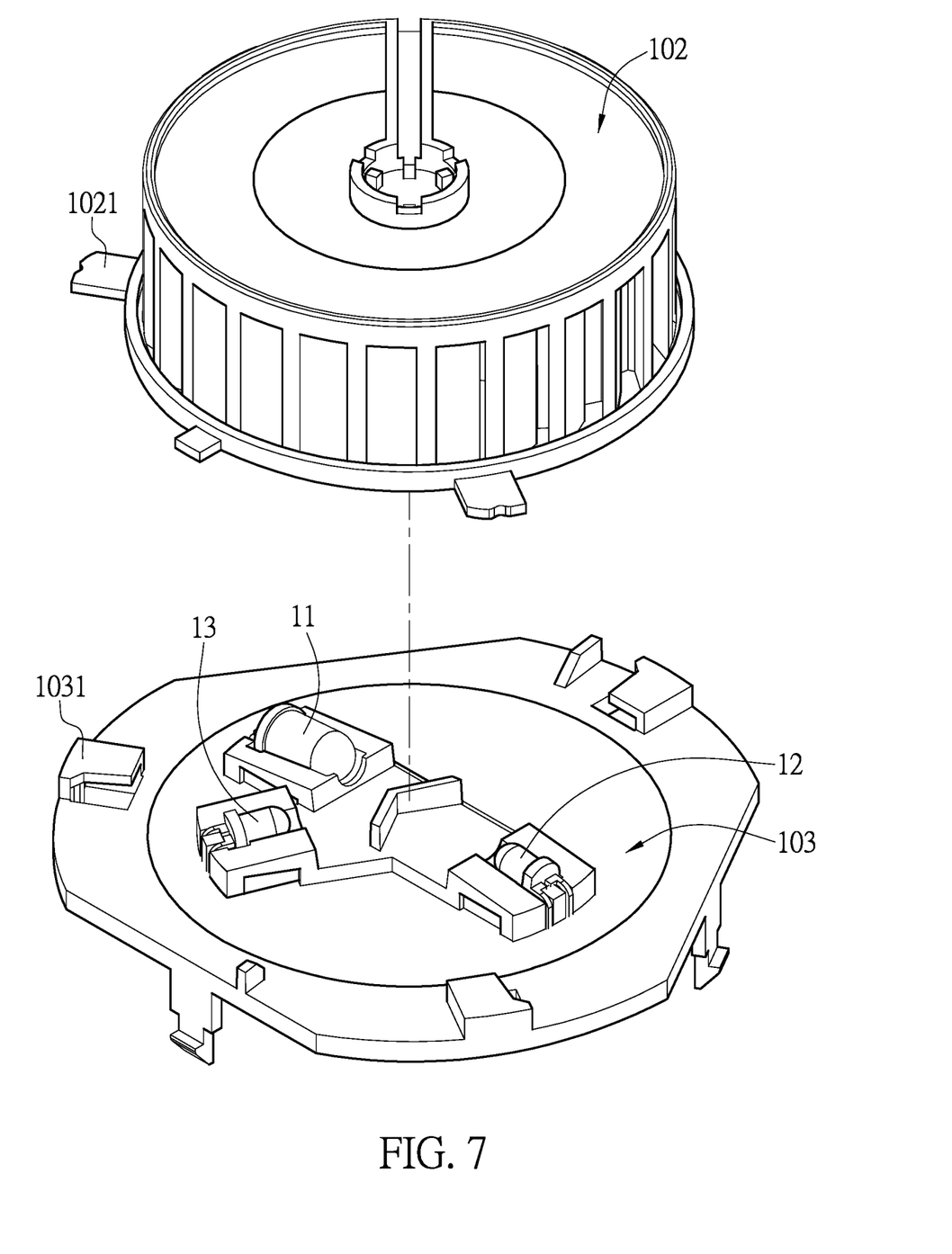
FIG. 7 is a partial exploded view of another smoke detecting device of the present disclosure.
Figure 8:
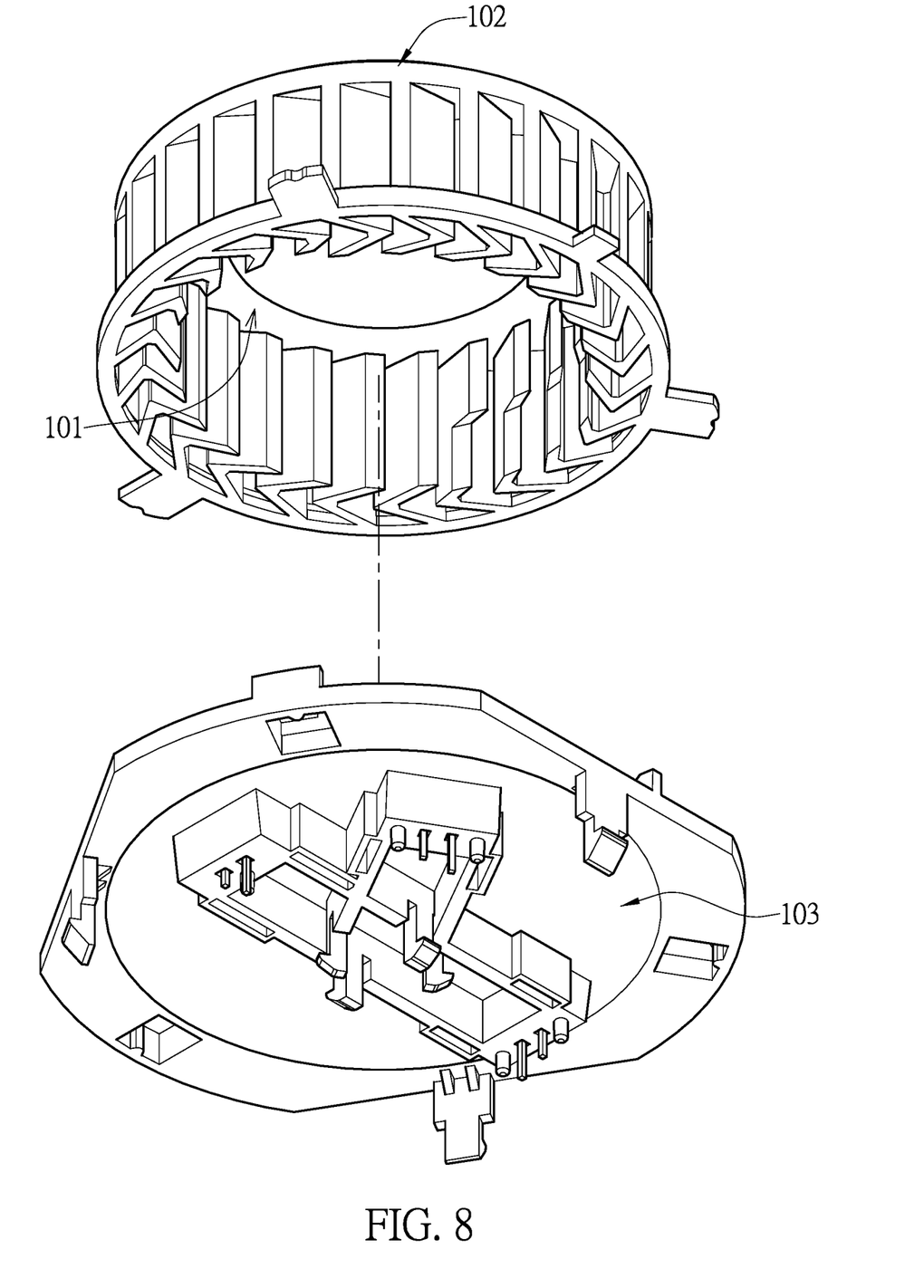
FIG. 8 is another partial exploded view of another smoke detecting device of the present disclosure.
Figure 9:
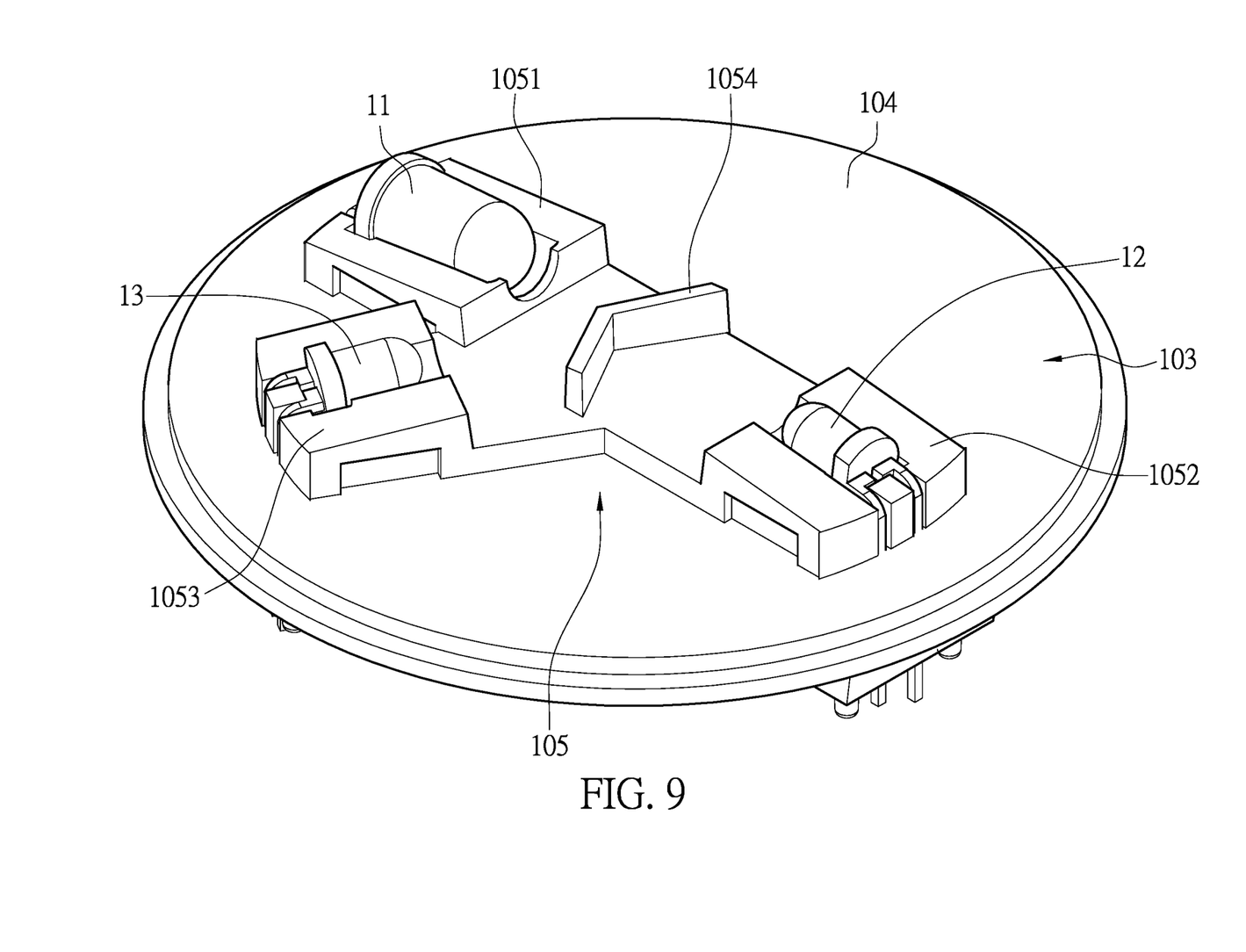
FIG. 9 is a partial schematic view of the main base of another smoke detecting device of the present disclosure.

Further, as shown in FIGS. 7 and 8, the main body 10 may have a main cover 102 and a main base 103, and the main cover 102 covers the main base 103. The smoke detecting chamber 101 is formed between the main cover 102 and main base 103.

To allow the main cover 102 to better cover the main base 103, one or more engaging members 1021 can be placed around the main cover 102, and one or more engaging slots 1031 can be placed around the main base 103, so that the engaging member 1021 can be engaged with the engaging slot 1031. However, there is no limitation on the configurations of the engaging member 1021 and the engaging slot 1031, and they may be adapted according to practical requirements.

Furthermore, the light-emitter 11, the first light-receiver 12, and a second light-receiver 13 can be arranged in the main body 10.

Specifically, the light-emitter 11 is located on the main base 103 and within the smoke detecting chamber 101 to emit detection light into the smoke detecting chamber 101, so as to allow for scattering through collision with the smoke particles. In this embodiment, the light-emitter 11 may be an infrared light emitting diode, and the detection light may be an infrared light.

Figure 12:
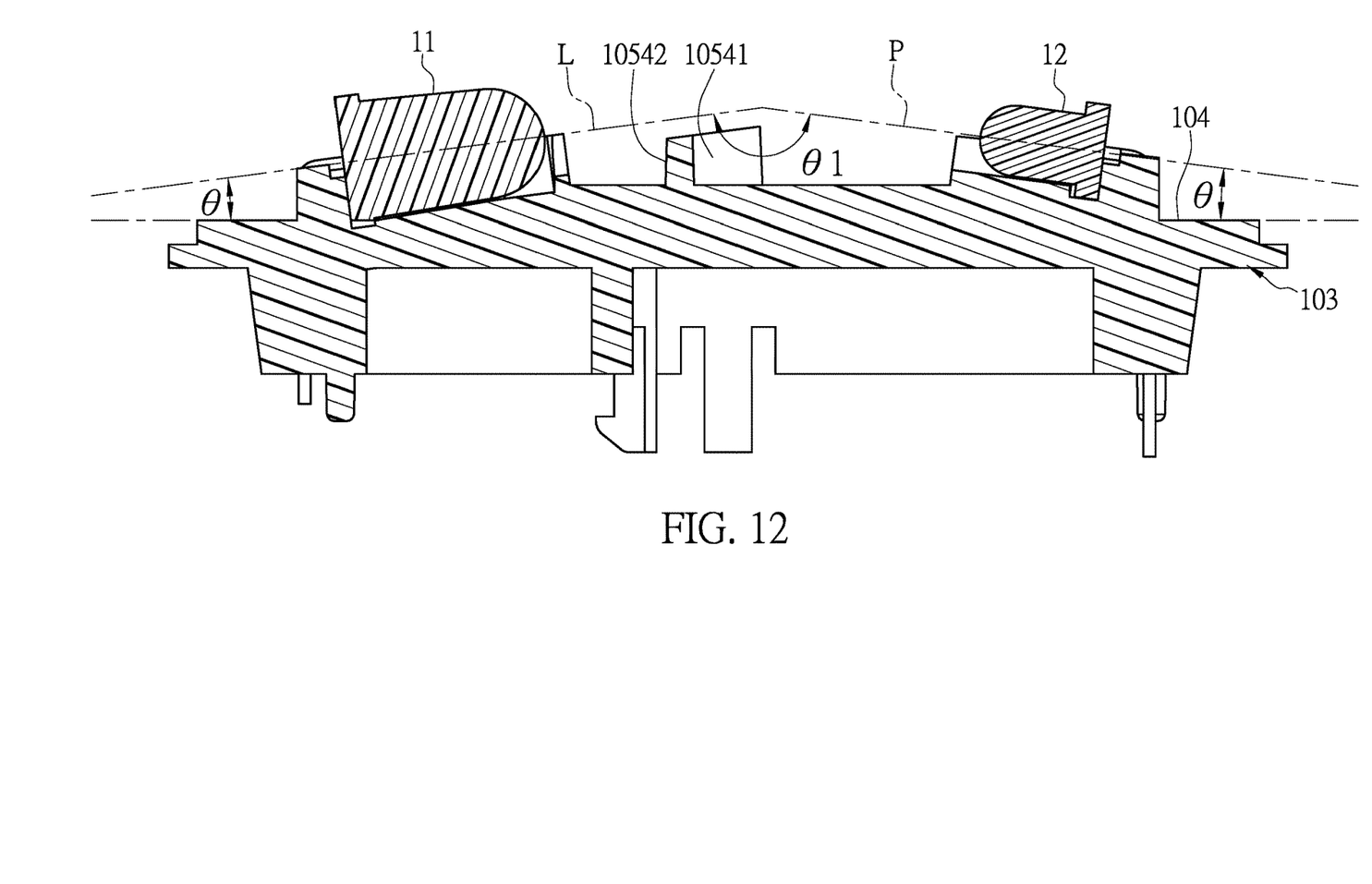
FIG. 12 is a cross-sectional view taken along line XII-XII of FIG. 11.

The first light-receiver 12 is located on the main base 103 and within the smoke detecting chamber 101, and the optical axis P of the first light-receiver 12 and the optical axis L of the first light-emitter 11 cooperatively define a first scattering angle $\theta 1$ there-between, as shown in FIG. 12. In other words, the first scattering angle $\theta 1$ is an angle formed by the optical axis P of the first light-receiver 12 and the optical axis L of the light-emitter 11. The first light-receiver 12 can be an infrared light receiving diode, and the first scattering angle $\theta 1$ is preferably about 130 degrees.

Figure 10:
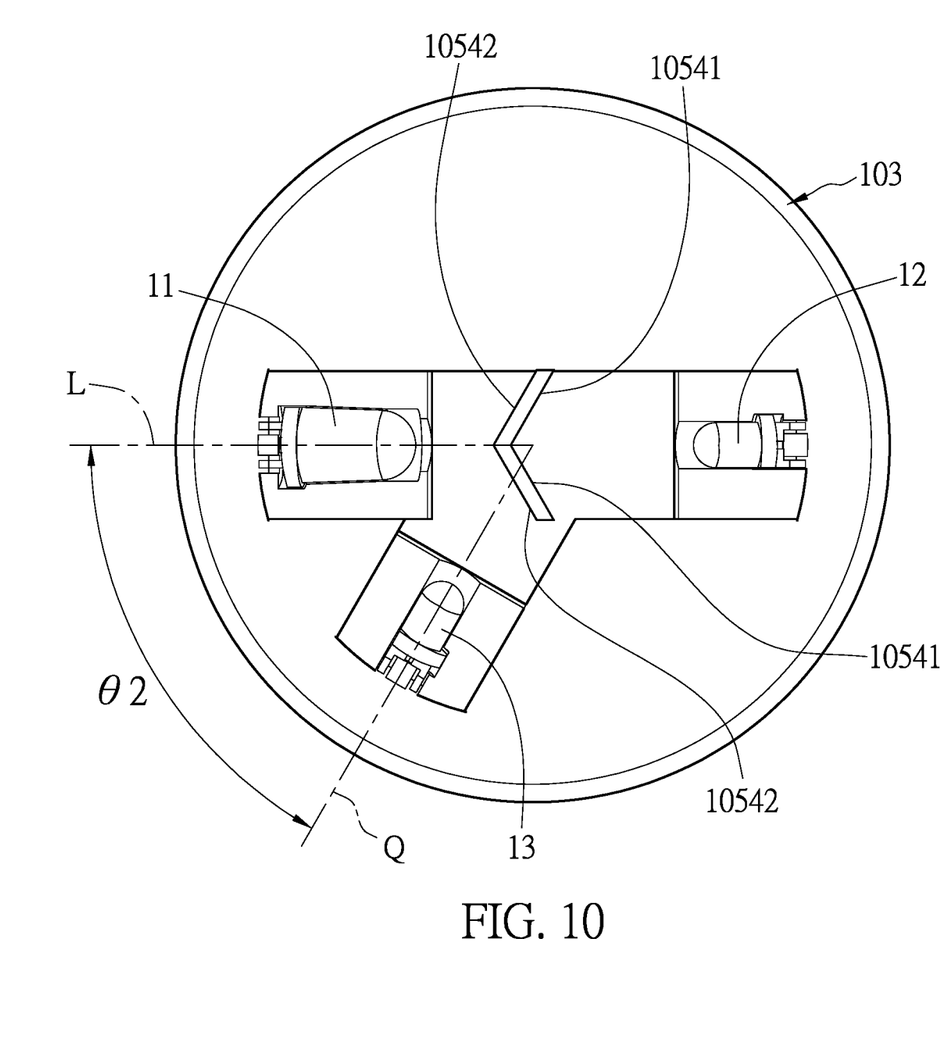
FIG. 10 is another partial schematic view of the main base of another smoke detecting device of the present disclosure.
Figure 11:
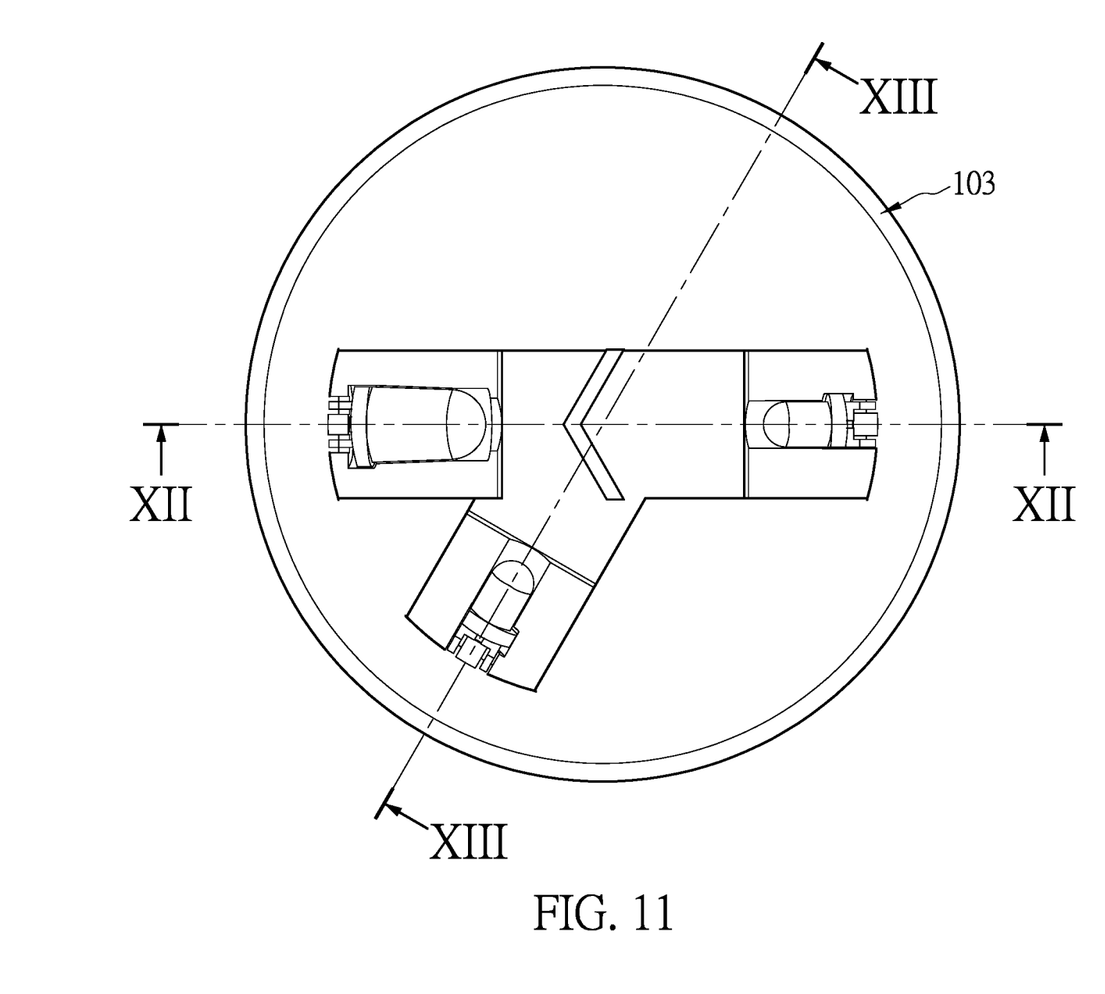
FIG. 11 is yet another partial schematic view of the main base of another smoke detecting device of the present disclosure.

The second light-receiver 13 is located on the main base 103 and within the smoke detecting chamber 101, and the optical axis Q of the second light-receiver 13 and the optical axis L of the first light-emitter 11 cooperatively define a second scattering angle $\theta 2$ there-between, as shown in FIG. 10. In other words, the second scattering angle $\theta 2$ is an angle formed by the optical axis Q of second light-receiver 13 and the optical axis L of the light-emitter 11. The second light-receiver 13 can be an infrared light receiving diode, and the second scattering angle $\theta 2$ is smaller than the first scattering angle $\theta 1$. The second scattering angle $\theta 2$ is preferably about 60 degrees.

Figure 13:
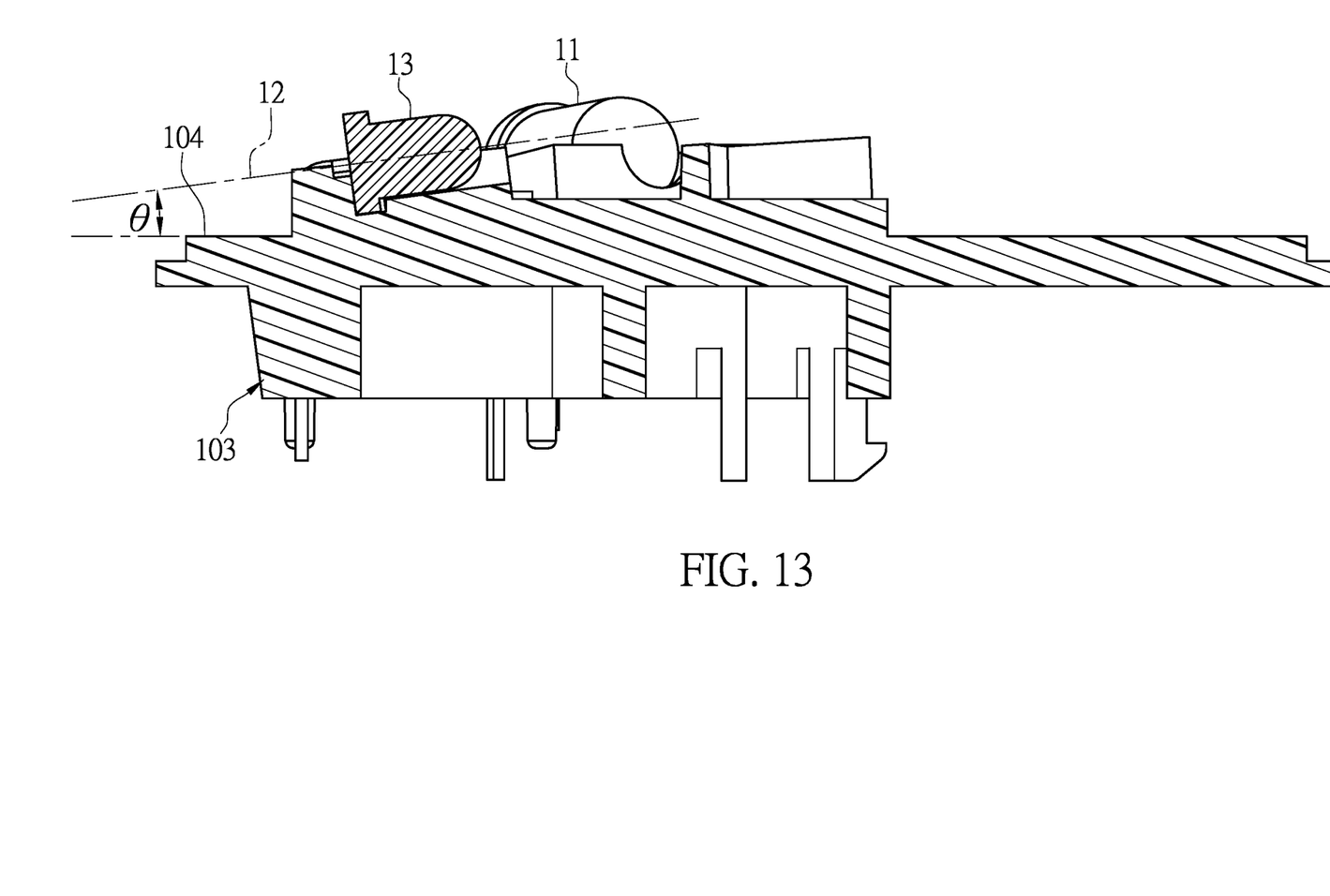
FIG. 13 is a cross-sectional view taken along line XIII-XIII of FIG. 11.

It is worth mentioning that in the present embodiment, the first light-receiver 12 and the light-emitter 11 are arranged oppositely. The first light-receiver 12 and light-emitter 11 have the same mounting elevation angle, and the elevation angle is preferably about 7.5 degrees. In addition, the second light-receiver 13 is closer to the light-emitter 11 than to the first light-receiver 12. The second light-receiver 12 also has the same mounting elevation angle as light-emitter 11, and the elevation angle is preferably about 7.5 degrees. That is, as shown in FIGS. 12 and 13, the optical axis of the light-emitter 11 forms an angle $\theta$ of 7.5 degrees with the surface 104 of the main base 103, the optical axis of the first light-receiver 12 forms an angle $\theta$ of 7.5 degrees with the surface 104 of the main base 103, and the optical axis of the second light-receiver 13 forms an angle $\theta$ of 7.5 degrees with the surface 104 of the main base 103. Furthermore, since the optical axis of the light-emitter 11 is not collinear with that of the first light-receiver 12, the detection light emitted by the light-emitter 11 does not directly enter the first light-receiver 12.

Moreover, the main base 103 is provided with a mounting base 105 formed on the surface 104 of the main base 103. The mounting base 105 has a light-emitter mounting portion 1051, a first light-receiver mounting portion 1052, a second light-receiver mounting portion 1053, and a light-guiding portion 1054. The light-emitter 11 is mounted on the light-emitter mounting portion 1051, the first light-receiver 12 is mounted on the first light-receiver mounting portion 1052, the second light-receiver 13 is mounted on the second light-receiver mounting portion 1053, and the light-guiding portion 1054 is located between the light-emitter mounting portion 1051 and the first light-receiver mounting portion 1052. The light-guiding portion 1054 is closer to the light-emitter mounting portion 1051 with the light-emitter 11 than to the first light-receiver mounting portion 1052 with the first light-receiver 12, and the light-guiding portion 1054 is V-shaped with two light-guiding surfaces 10541 facing toward the first light-receiver 12. The angle between the two light-guiding surfaces 10541 can be an obtuse angle, as shown in FIG. 10. Therefore, when smoke particles enter the smoke detecting chamber 101, the detection light emitted by the light-emitter 11 can enter the first light-receiver 12 as scattered light generated by the collision with smoke particles, and the generated scattered light can also enter the first light-receiver 12 via the guidance of the two light-guiding surfaces 10541, enabling the first light-receiver 12 to receive stronger light intensity signals to increase sensitivity.

In addition, the light-guiding portion 1054 has two refractive surfaces 10542 respectively arranged opposite to the two light-guiding surfaces 10541. One of the refractive surfaces 10542 is arranged to face toward the second light-receiver 13, so that when smoke particles enter the smoke detecting chamber 101, the detection light emitted by the light-emitter 11 can enter the second light-receiver 13 as scattered light generated by the collision with smoke particles, and the generated scattered light can also enter the second light-receiver 13 via the refraction of the refractive surface 10542, enabling the second light-receiver 13 to receive stronger light intensity signals to increase sensitivity.

In summary, the smoke detecting device of the present disclosure can make a relatively accurate determination through the characteristics that the first light-receiver and second light-receiver located at different angles react differently to smoke particles generated by different types of fire, thereby avoiding false alarms or delays of alarms.

Furthermore, since the light-guiding portion is located between the light-emitter and the first light-receiver, and the light-guiding portion is closer to the light-emitter than the first light-receiver, a light-guiding area thus can be formed between the first light-receiver and the light-guiding portion. Therefore, when smoke particles enter the smoke detecting chamber, the generated scattered light can enter the first light-receiver through the guiding of the light-guiding portion, so that the first light-receiver can receive stronger light intensity signals to increase sensitivity.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated.

Alternative embodiments will become apparent to those skilled in the art to which the present disclosure pertains without departing from its spirit and scope.

What is claimed is:

1. A smoke detecting device, comprising:
    a main body including a smoke detecting chamber formed therein for entry of smoke particles;
    a light-emitter being located within the smoke detecting chamber;
    a first light-receiver being located within the smoke detecting chamber, wherein an optical axis of the first light-receiver and an optical axis of the light-emitter cooperatively define a first scattering angle there-between; and
    a second light-receiver being located within the smoke detecting chamber, wherein an optical axis of the second light-receiver and an optical axis of the light-emitter cooperatively define a second scattering angle there-between, and wherein the second light-receiver is closer to the light-emitter than to the first light-receiver, and the second scattering angle is smaller than the first scattering angle;

wherein the main body has a main cover and a main base, the main cover covers the main base, and the smoke detecting chamber is formed between the main cover and the main base;

wherein the light-emitter, the first light-receiver, and the second light-receiver are disposed on the main base, the optical axis of the light-emitter forms an angle of 7.5 degrees with a surface of the main base, the optical axis of the first light-receiver forms an angle of 7.5 degrees with the surface of the main base, the optical axis of the second light-receiver forms an angle of 7.5 degrees with the surface of the main base, the first light-receiver and the light-emitter are arranged oppositely, and the optical axis of the first light-receiver is non-collinear with that of the light-emitter;

wherein the main base is provided with a mounting base formed on the surface of the main base, the mounting base has a light-emitter mounting portion, a first light-receiver mounting portion, a second light-receiver mounting portion, and a light-guiding portion, the light-emitter is mounted on the light-emitter mounting portion, the first light-receiver is mounted on the first light-receiver mounting portion, the second light-receiver is mounted on the second light-receiver mounting portion, and the light-guiding portion is located between the light-emitter mounting portion and the first light-receiver mounting portion;

wherein the light-guiding portion is V-shaped with two light-guiding surfaces facing toward the first light-receiver, an angle between the two light-guiding surfaces is an obtuse angle, and an angle bisector of the obtuse angle between the two light-guiding surfaces passes through the first light-receiver and through the light-emitter arranged opposite to the first light-receiver; and wherein the second scattering angle is 60 degrees and the first scattering angle is 130 degrees.

2. The smoke detecting device according to claim 1, wherein the light-guiding portion is closer to the light-emitter than to the first light-receiver.

3. The smoke detecting device according to claim 1, wherein the light-guiding portion has two refractive surfaces respectively arranged opposite to the two light guiding surfaces, and one of the two refractive surfaces faces toward the second light-receiver.

4. A smoke detecting device, comprising:
a main body including a smoke detecting chamber formed therein for entry of smoke particles;
a light-emitter being located within the smoke detecting chamber;
a first light-receiver being located within the smoke detecting chamber, wherein an optical axis of the first light-receiver and an optical axis of the light-emitter cooperatively define a first scattering angle there-between; and
a second light-receiver being located within the smoke detecting chamber, wherein an optical axis of the second light-receiver and an optical axis of the light-emitter cooperatively define a second scattering angle there-between, and wherein the second light-receiver is closer to the light-emitter than to the first light-receiver, and the second scattering angle is smaller than the first scattering angle;
wherein the main body has a main cover and a main base, the main cover covers the main base, and the smoke detecting chamber is formed between the main cover and the main base; wherein an irregularly-shaped shading member is located within the smoke detecting chamber; and wherein the irregularly-shaped shading member is located between the optical axis of the first light-receiver and the optical axis of the second light-receiver; and
wherein the second scattering angle is 60 degrees and the first scattering angle is 130 degrees.

\* \* \* \* \*